US008850611B1

(12) United States Patent
Rose et al.

(10) Patent No.: US 8,850,611 B1
(45) Date of Patent: Sep. 30, 2014

(54) SIMULTANEOUS TOPOGRAPHIC AND ELEMENTAL CHEMICAL AND MAGNETIC CONTRAST IN SCANNING TUNNELING MICROSCOPY

(71) Applicant: UChicago Argonne, LLC, Argonne, IL (US)

(72) Inventors: Volker Rose, Downers Grove, IL (US); Curt A. Preissner, Chicago, IL (US); Saw-Wai Hla, Chicago, IL (US); Kangkang Wang, Fremont, CA (US); Daniel Rosenmann, Naperville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 0 days.

(21) Appl. No.: 13/791,157

(22) Filed: Mar. 8, 2013

(51) Int. Cl.
*G01Q 60/16* (2010.01)
(52) U.S. Cl.
USPC ................... 850/29; 850/21; 850/22; 850/26; 850/27; 850/63
(58) Field of Classification Search
USPC ........................ 850/21, 22, 26, 27, 29, 62, 63
See application file for complete search history.

(56) References Cited

U.S. PATENT DOCUMENTS 6,005,246 A * 12/1999 Kitamura et al. ............... 850/21

OTHER PUBLICATIONS

Eguchi, et al ("Element specific imaging by scanning tunneling microscopy combined with synchrotron radiation light" Applied Physics Letters 89, 243119 (2006)).*
Chiu, et al., *Collecting Photoelectrons with a Scanning Tunneling Microscope Nanotip*, Applied Physics Letters, Mar. 10, 2008, pp. 103101-1-103101-3, vol. 92, American Institute of Physics.
Eguchi, et al., *Element Specific Imaging by Scanning Tunneling Microscopy Combined with Synchrotron Radiation Light*, Applied Physics Letters, Dec. 14, 2006, pp. 243119-1-243119-3, vol. 89, American Institute of Physics.
Saito, et al., *Development of a Scanning Tunneling Microscope for in situ Experiments with a Synchrotron Radiation Hard-X-Ray Microbeam*, Journal of Synchrotron Radiation, Jan. 15, 2006, pp. 216-220, vol. 13, International Union of Crystallography, Great Britain.

* cited by examiner

*Primary Examiner* — Michael Maskell
(74) *Attorney, Agent, or Firm* — Foley & Lardner LLP

(57) ABSTRACT

A method and system for performing simultaneous topographic and elemental chemical and magnetic contrast analysis in a scanning, tunneling microscope. The method and system also includes nanofabricated coaxial multilayer tips with a nanoscale conducting apex and a programmable in-situ nanomanipulator to fabricate these tips and also to rotate tips controllably.

17 Claims, 5 Drawing Sheets

SIMULTANEOUS TOPOGRAPHIC AND ELEMENTAL CHEMICAL AND MAGNETIC CONTRAST IN SCANNING TUNNELING MICROSCOPY

This invention was made with United States government support pursuant to a contract with the following agency: U.S. Department of Energy Contract No. DE-ACO2-06CH11357. The United States government has certain rights in this invention.

FIELD OF THE INVENTION

The invention relates generally to a scanning tunneling microscope and methods of use. More particularly the invention is related to method and system for performing simultaneous topographic and elemental chemical and magnetic contrast analysis in a scanning tunneling microscope. The method and system also includes nanofabricated coaxial multilayer tips with a nanoscale conducting apex and a programmable in-situ manipulator to fabricate these tips and also to rotate tips controllably.

BACKGROUND OF THE INVENTION

Advancements in material fabrication demand the tailoring of their properties to respond to immediate and future technical challenges. This implies creating materials that may not even exist naturally, or modifying existing ones to promote suitable behavior. Therefore, to construct such materials, one needs to characterize them to understand their electronic, magnetic and chemical behavior. As compared to the bulk state, materials behave differently at the nanoscale. Therefore, a tool that is capable of providing contrast, that is, information on chemical, electronic and magnetic features of nanostructures will constitute an important technique that allows meeting the challenges of the 21st century.

Scanning probe microscopes (hereinafter "SPM") such as the scanning tunneling microscope (hereinafter "STM") or other variants can achieve the required spatial resolution.

However, one of the major problems with SPM's is that direct chemical or magnetic contrast cannot be obtained. This is due to the fact that tunneling electrons originate only from states close to Fermi energy, i.e., those states that do not carry information specific to the material under investigation. On the other hand, X-ray spectroscopies allow determining chemical and magnetic properties of materials, albeit with limited spatial resolution.

Since its development, STM has shown unprecedented power in resolving surface atomic and electronic structure with the ultimate spatial resolution. Recent developments on spin-polarized STM have also allowed the study of magnetism down to single atomic scale. As noted hereinbefore, elemental sensitivity has been lacking due to the fact that STM only probes the valence and conduction band electrons that are located near the Fermi level. Unlike core-level electrons, the electronic structure near the Fermi level does not carry direct information about the atomic species, and therefore cannot be used to "fingerprint" chemical elements on the surface.

In order to achieve elemental sensitivity at the ultimate spatial resolution, synchrotron X-ray STM (hereinafter "SXSTM") and synchrotron X-ray atomic force microcopy (SXAFM) have been developed and show great analytical potential. In SXSTM, a synchrotron X-ray beam illuminates onto the sample surface during scanning, resulting in photo-excitations that can either enhance or suppress the tunneling process depending on the bias polarity. Because the excitation energies are element specific, at any particular X-ray energy, the intensity of these excitations will vary locally on the sample's surface depending on the local chemical composition. Therefore, as the tip is scanning, the local variation in photo-excitations results in additional modulations in the tunneling current. By scanning with different X-ray energies, one can then achieve complete chemical mapping of the surface. Magnetic contrast can also be obtained when the polarization of the X-rays is utilized. One serious problem SXSTM suffers from so far is the interference of the X-ray excitations on the STM feedback system. Since the X-ray induced currents are superimposed onto the conventional tunneling currents, the topography and the chemical contrasts are convoluted together. More problematically, X-ray excitations can destabilize the feedback, sometimes causing the tip to fully retract.

SUMMARY OF THE INVENTION

The above-referenced problems can be solved by the present invention which in one embodiment separates a modulation signal given by photo excitations from a pure topographic signal that is required to control a feedback system of an STM. This separation is achieved by use of a signal filter which allows rejecting of modulations of the STM current. This concept drastically increases spatial resolution of current state-of-art X-ray microscopy from tens of nanometers to near atomic resolution, and will also add significantly to chemical and magnetic sensitivity for SPM. In the instant invention the system and method can separate the current contribution which is responsible for photo excitation from conventional tunnel current which is related to surface topography of a material being examined.

The invention includes a set of components or features which enable achieving the above described objectives to solve the prior art problems. These include, inter alia, 1) use of a topography filter (topo-filter). Data from SXSTM experiments consist of currents measured by the probe. This current is composed of a conventional tunnel current and the current produced by X-ray excitations. The conventional tunnel current carries information about the sample topography, or more precisely, the local density of states. The X-ray excited current carries the chemical and magnetic signature. The topo-filter separates the conventional tunnel current from the X-ray enhanced current, while maintaining stable tunneling conditions when the sample is under X-ray illumination. Without the filter topography and chemical contrasts would be entangled, rendering adequate chemical imaging impossible; 2) Nanofabricated coaxial multilayer tips with nanoscale conducting apex: The larger the area illuminated by the X-rays, the larger the number of photoelectrons ejected from the sample. These electrons could come from anywhere throughout the sample and would normally be collected by the apex and sidewalls of a conventional tip. Therefore, the spatial resolution of SXSTM would be limited by the size of the X-ray beam. The nanofabricated coaxial multilayer tips with nanoscale conducting apex were engineered to resolve this problem. This tip enhances the sensitivity and spatial resolution of the measurement by rejecting background of photoejected electrons arriving at the sidewall of the tip. The nanofabricated coaxial multilayer tips focus the electron detection to the apex. Consequently, this feature makes it possible to attain ultra-high spatial resolution; and 3) NANO-Rotator: In order to fabricate the tips (which expose a nanoscale conducting apex after the coating of the tip) a programmable in-situ manipulator (the NANORotator) with rotational degree of freedom was created. The NANORotator can be attached and used in a scanning electron microscope (SEM) or focused ion beam (FIB) microscope. It adds an additional rotational degree of freedom to conventional FIB/SEM translation stages. It allows rotating tips in front of the stationary FIB ion gun with great flexibility, since the rotational movement at different speeds or intervals can be introduced through code programmed in the microprocessor. Thanks to the controlled rotation, coating material can be evenly removed in the apex region leading to a nanoscale exposed conducting apex.

Additional features, advantages and embodiments of the disclosure herein include the following detailed description, drawings and claims. Moreover, it is to be understood that both the foregoing summary of the invention and detailed description are exemplary and intended to provide further explanation without limiting the scope of the claims set forth hereinafter.

BRIEF DESCRIPTION OF THE DRAWINGS

The foregoing description and following disclosure and other objects, aspects, features and advantages of the invention will become apparent by reference to the following Detailed Description taken in conjunction with the accompanying drawings.

DETAILED DESCRIPTION OF PREFERRED EMBODIMENTS

Figure 1:
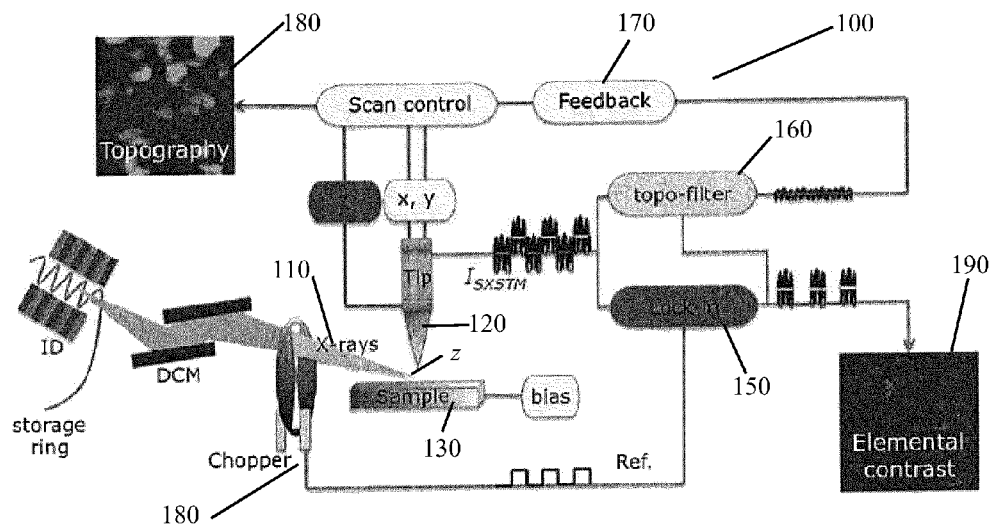
FIG. 1 illustrates an SXSTM schematic system diagram wherein synchrotron X-rays pass through a chopper system before arriving at a sample surface with a measured tip current separated into two channels via a lock-in amplifier and a topo filter; a conventional tunneling component is then fed into an STM feedback system regulating tip-sample separation, while an X-ray induced component containing chemical contracts is recorded in a separate channel.

In FIG. 1 is shown one embodiment of an SXSTM system 100. In this SXSTM system 100 there are two main analytical components induced by X-ray illumination 110. One ($I_{x-ray}^{tunnel}$) component is the enhancement (or suppression) of the conventional tunneling current caused by excitations of core-electrons into states that are near the Fermi level, while the other arises from electrons that are photo-ejected from both a tip 120 and sample 130. These photo-ejected electrons can arrive at or depart from the tip, resulting in an additional component ($I_{x-ray}^{photo}$) in the measured tip current. The total measured tip current when tunneling can be then expressed as:

$$I_{SXSTM} = I_{tunnel} + I_{x-ray}^{photo} + I_{x-ray}^{tunnel},$$

where ($I_{tunnel}$) is the conventional tunneling current. In constant-current mode, the feedback system monitors the total tip current $I_{SXSTM}$ and reacts to changes in $I_{SXSTM}$ by adjusting the tip-sample separation z. One can immediately see the problem here. While adjusting, z can effectively regulate $I_{tunnel}$ and $I_{x-ray}^{tunnel}$ because of their exponential dependence on z. However, it has in general little effects on $I_{tunnel}$ and $I_{x-ray}^{photo}$. Even worse is when $I_{x-ray}^{photo}$ carries the opposite sign as $I_{tunnel}$, causing the feedback to react in the wrong direction.

Efforts have been made to reduce $I_{x-ray}^{photo}$ as much as possible by shielding the tip 120 with an insulating coating such as BN, glass or $SiO_2$ (named "smart tips"), however a finite amount of $I_{x-ray}^{photo}$ is always present. In one embodiment of the invention a solution is to separate out the remaining X-ray induced currents from conventional tunneling currents, and let the STM feedback only 'see' the conventional components. To achieve this, we have installed a chopper system 140 running at 3 kHz in the X-ray beam path, as shown in FIG. 1. The chopper system switches the X-ray beam 110 on and off at frequency ω causing $I_{x-ray}^{photo}$ and $I_{x-ray}^{tunnel}$ signals to exhibit a square-wave shape with a 50% duty cycle:

$$I_{x-ray}^{photo} + I_{x-ray}^{tunnel} = I_{x-ray}S(t) = \frac{1 + 5gn(\sin(\omega t))}{2}$$

is a square wave function. In the SXSTM system 100, a synchrotron form of the X-rays 110 pass through the chopper system 140 before arriving at the sample 130. The measured tip current gets separated into two channels with the help of a lock-in amplifier 150 and a topo-filter 160. The conventional tunneling component is then fed into a STM feedback system 170 regulating the tip-sample separation z, while the other X-ray induced component containing chemical contrasts is recorded in a separate channel.

Figure 2:
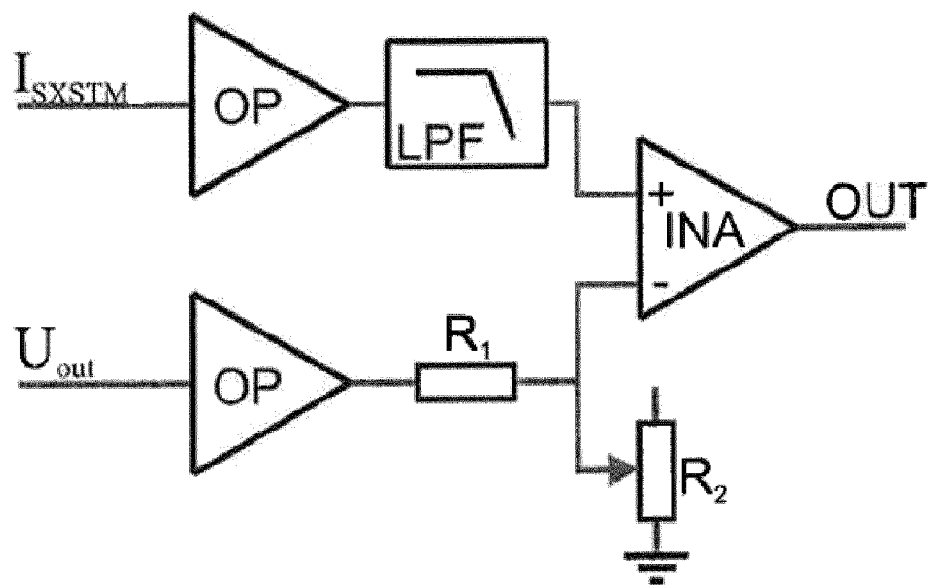
FIG. 2 is a topo-filter schematic diagram wherein $I_{x-ray}$ are circuit input and OUT is an extracted topography component $I_{tunnel}$. The "OP" is for an operations amplifier, "LPF" is a low pass filter, "INA" is an instrumentation amplifier, "$R_1$" is a resistor and "$R_2$" is a potentiometer.

When tunneling, the total tip current is then $I_{SXSTM} = I_{tunnel} + I_{x-ray}S(t)$. By scanning at a relatively slow speed (~3 ms/pixel), the conventional tunneling current signal contributed by surface topography can be readily sampled at 300 Hz. As a consequence, the X-ray induced current is in a higher frequency channel compared to the conventional tunneling current. One might think that a low-pass filter with a cut-off frequency lower than the chopping frequency would be able to separate out the conventional tunneling current. However, a quick analysis gives: $I_{SXSTM} - I_{LOW-PASS} = I_{tunnel} + I_{x-ray}/2$. There is still an X-ray contribution left. In FIG. 2 $I_{SXSTM}$ and $I_{x-ray}$ are inputs to the circuit, and OUT is the extracted topography component $I_{tunnel}$. OP stands for operational amplifier; LPF stands for low-pass filter, INA stands for instrumentation amplifier, $R_1$ is a resistor and $R_2$ is a potentiometer.

To extract the true topography signal $I_{tunnel}$, a filter can be used as shown in FIG. 2. In this filter (also referred to as the topo-filter 160), $I_{SXSTM}$ (a voltage signal from the STM preamplifier) is first fed into a unit-gain amplifier, followed by a third-order low-pass filter with a cut-off frequency at 300 Hz. The output of the low-pass filter is then $I_{tunnel} + I_{x-ray}/2$. To remove the remaining X-ray component, the lock-in amplifier 150 is employed. External to the topo-filter, $I_{SXSTM}$ is fed into a lock-in amplifier locking at frequency ω. The output of the lock-in is given by:

$$U_{out}(t) = \frac{G}{T}\int_{t-T}^{t} \sin(\omega t) I_{SXSTM} dt'$$
$$= \frac{G}{T}\int_{t-T}^{t} \sin(\omega t)\left(I_{tunnel} + I_{x-ray}\frac{1+\text{sgn}(\sin(\omega t))}{2}\right) dt'$$

where T is the integration time constant, and G is the gain. With a time-constant set at $>2\lambda/\omega$, and a gain of 10, the integral gives approximately 3.2 $I_{x-ray}$. The output of the lock-in $U_{out}$ is therefore directly proportional to the X-ray induced current signal. $U_{out}$ is then fed into the topo-filter 160, followed by a unit-gain amplifier and an adjustable voltage divider $k=R_2/(R_1+R_2)$. The low-passed $I_{SXSTM}$ and the adjusted lock-in output $k \times U_{out}$ are then fed into an instrumentation amplifier yielding the difference between the two inputs:

$$\text{OUT} = I_{tunnel} + \frac{I_{x-ray}}{2} - k \times \left(3.2\frac{G}{10}I_{x-ray}\right)$$

In order to remove the X-ray component, $R_2$ can be adjusted to a proper value so that $k \approx 1.56/G$. In an actual SXSTM experiment, the tip 120 is first brought to just out of the tunneling range, where $I_{tunnel}$ should equal to zero. Then with X-ray on and the lock-in amplifier 150 set properly, $R_2$ is adjusted until the topo-filter 160 outputs zero. The tip 120 can then be released into the tunneling range, and the same $R_2$ and lock-in settings are maintained throughout the experiment. Alternatively, the adjustment can also be carried out while the tip 120 is in tunneling condition. In this case OUT is adjusted to the predetermined current setpoint of the STM. Since the output of the topo-filter 160 only contains the conventional tunneling component (low-passed at 300 Hz), it is fed into the STM's feedback system 170. The feedback then regulates the tip-sample separation z (via z-piezo voltage) according to changes in $I_{tunnel}$ alone, in the same way as in a conventional STM. As a result, the tunneling condition can be well protected from the disturbances induced by X-ray illumination. The output from the lock-in amplifier 150, on the other hand, contains only the X-ray induced components, and is fed into a separate recording channel. The topographical and the chemical contrast signals are now separated into two different channels for providing outputs 180 and 190, respectively.

Figure 3A:
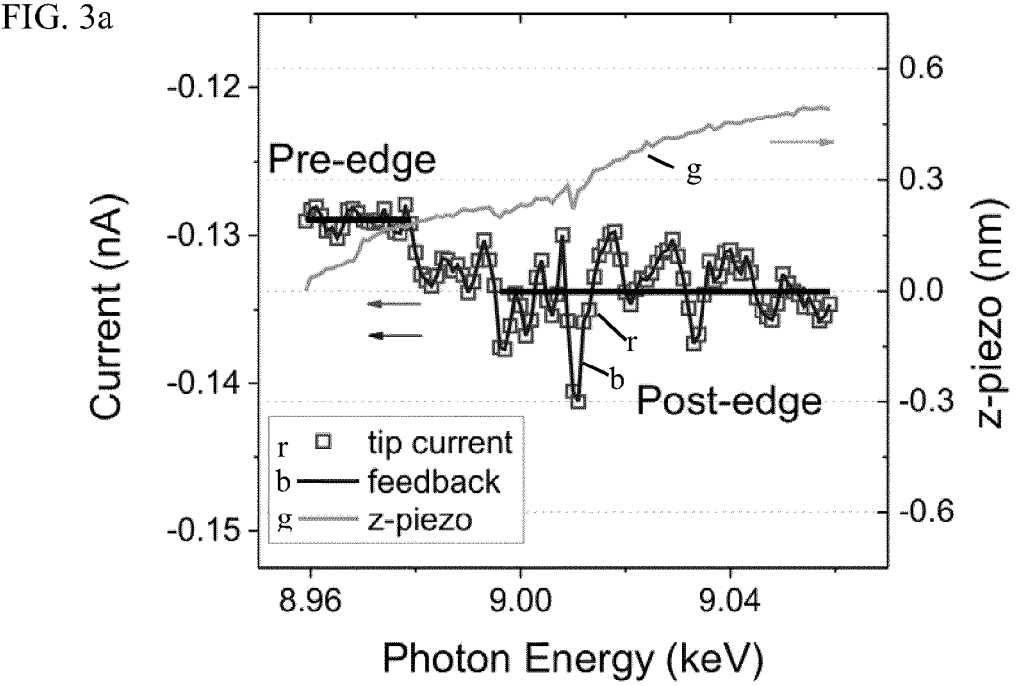
FIG. 3a shows a spectroscopy scan of X-ray analysis across a Cu K-edge with the tip tunneling over a Cu(111) surface and data is for the condition without a topo-filter being installed and an X-ray slit size of 50×50 µm$^2$.
Figure 3B:
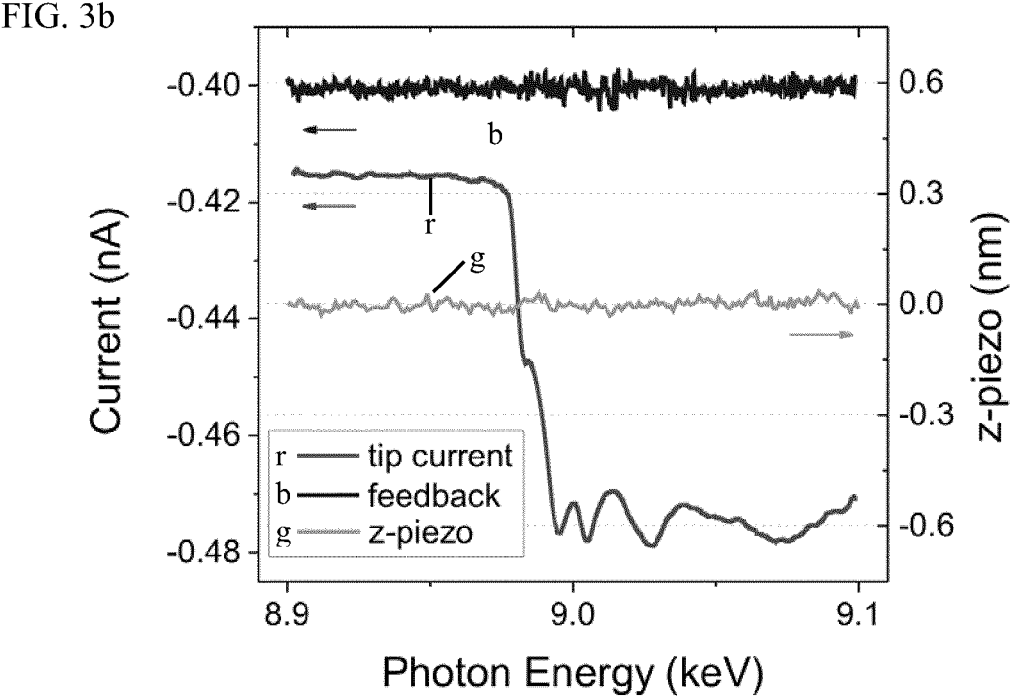
FIG. 3b shows results with use of the topo-filter and an X-ray slit size of 500×500 µm$^2$.

To verify the functionality of the proposed topo-filter, experiments have been carried out at the Advanced Photon Source, at Argonne National Laboratory. We have verified the functionality of the topo-filter 160 in both, the spectroscopy mode (ramping the photon energy while the tip tunnels over a fixed sample location) and imaging mode (rastering the tip over the sample surface while the X-ray energy is fixed to a particular absorption energy of interest). FIGS. 3a and 3b show a comparison of spectroscopy scans of the photon energy while the tip 120 is tunneling over a Cu(111) surface. FIG. 3a is without the topo-filter installed, X-ray slit size $50 \times 50$ µm$^2$. Tip current ("ed" squares) is identical to the signal used for STM feedback loop ("blue" line). Both show an increase by ~5 pA when the X-ray energy is scanned from pre-edge to post-edge. Black lines are drawn for visual guidance. z-piezo ("green") retracted by >0.5 nm. FIG. 3b is shown with the topo-filter installed, X-ray slit size $500 \times 500$ µm$^2$. Tip current ("red") increased by ~60 pA while the filtered current for feedback ("blue") remains stable. The stable z-piezo voltage ("green") clearly shows that the topography and chemical contrast are well separated in this case.

The X-ray illumination with a photon energy around the Cu K edge on the sample therefore gives rise to an absorption spectrum that can be measured using the tip current ($I_{SXSTM}$ shown in red). If this tip current is directly used for the feedback loop (as in FIG. 3(a)), the z-piezo would react attempting to maintain a predetermined current setpoint. As shown in FIG. 3(a), the tip retracted by over 0.5 nm when trying to stabilize the tip current (which it still failed photo to do because of the approximately linear response of $I_{x-ray}^{photo}$ on $z^{15}$). Post-edge, the tip current increased by ~5 pA in magnitude and becomes very noisy due to the interplay between the STM feedback system and X-ray induced currents. The fact that both the z-piezo and the tip current react to the energy sweep indicates the problematic convolution of the signals.

However, when the topo-filter 160 is used, this is obviously not the case. Here we have photo increased the X-ray slit size from $50 \times 50$ µm$^2$ to $500 \times 500$ µm$^2$ which boosts the $I_{x-ray}^{photo}$ by ~12 times to ~60 pA. Despite the significant increase in X-ray induced currents, the z-piezo (green) remains stable and does not react to the changes in the X-ray energy. This clearly indicates that the topo-filter 160 has removed the X-ray induced current and provides only the topographic component (blue) to the feedback system. As a result, stable tunneling current is perfectly maintained allowing for the simultaneous measurement of topographic and chemical properties.

In this preferred embodiment is an easy-to-implement form of the topo-filter 160 that can separate out X-ray induced signals from conventional tunneling signals in STM, taking advantage of the different frequency domains they reside in. This allows stable tunneling conditions to be maintained while X-ray is illuminating, thereby enabling simultaneous mapping of topography and chemical contrasts, potentially at the ultimate spatial resolution. Incorporating other modulation techniques such as dI/dV operating in different frequency channels, electronic and other properties of the surface can also be mapped at the same time. Finally, the schematic and the filter 160 proposed here can be easily generalized to other similar systems such as laser assisted STM's.

Figure 4A:
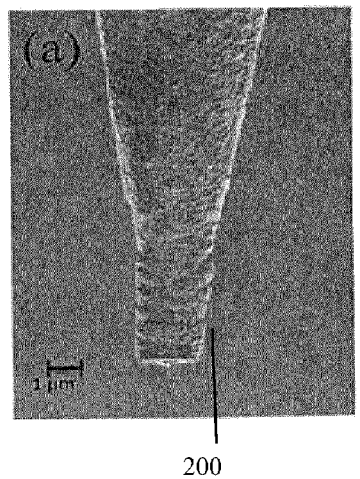
FIGS. 4a and b show scanning electron micrographs of a coaxial. STM tip embodiment of the invention
Figure 4B:
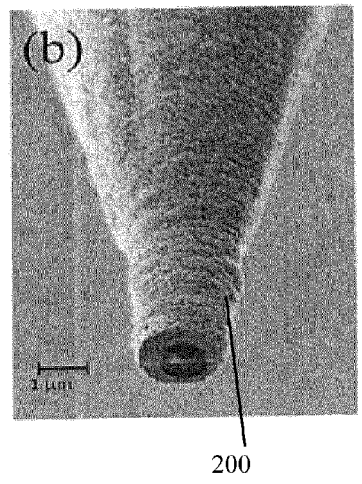
FIG. 4c shows a schematic view of the tip design of FIGS. 4a and 4b.
Figure 4C:
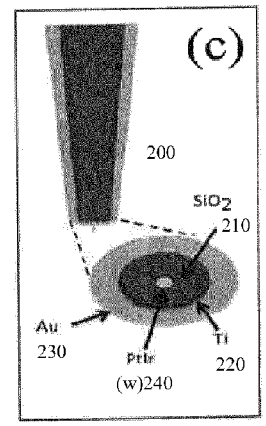

In another embodiment of this invention a new type of STM tip 200 is shown in FIGS. 4a-4c. As X-rays illuminate the sample, photoelectrons are ejected from it. These scattered electrons could come from anywhere throughout the sample 130 and would normally be collected by the apex or sidewalls of a conventional tip, causing a current and, therefore, severely reduce the spatial resolution of the SXSTM measurement. The problem with standard STM tips is that they are not shielded from the electrons being ejected from the sample surface by X-ray impingement. Thus, in order to achieve high spatial resolution, only electrons that stem from the nanoscale sample area under the tip apex should contribute to the signal. The invention herein comprises a conducting form of the tip 200 (including but not limited to Platinum Iridium (Ptr) or tungsten (W)) that have been fabricated and tested so far, but also ferromagnetic, antiferromagnetic and superconducting tips that are under development as well) that is coated with several layers of materials with the indicated function:

1) The conducting tip 200 (Ptr and W tested) collects the tunneling current at the tip apex.
2) A thick insulating coating of silicon dioxide ($SiO_2$) 210 reduces background by preventing that scattered electrons reach the conducting core.
3) A thin titanium (Ti) film 220 serves as a seed layer to achieve uniform growth of the outer gold (Au) film 230.

Without this layer the Au film 230 would not grow smoothly on the oxide layer 210.

4) A thick outer Au film (and the Ti seed layer 220) prevents charging of the tip 200. Furthermore, this allows for an additional bias to be applied to the outer layer of the tip; thus, changing the electric field around the tip in order to control photoejected electrons without changing the tunneling conditions of the core.

The detailed coaxial tip fabrication procedure preferably comprises 4 steps:

1) Etching: A PtIr or W wire of typically 250 μm diameter is etched in order to obtain a sharp apex. The PtIr tips 240 are etched in CaCl2 solution (35 V AC for 1.5 min; 32 V AC for 1.5 min; 28 V AC until wire is fully etched; then fine etching at 2 V AC in a loop wire). Tungsten tips are etched in NaOH (10 V AC and subsequent fine etching at 1 V AC). After the etching tips are thoroughly cleaned by deionized water, acetone, and alcohol.

2) Deposition: Films are deposited in a sputtering system (base pressure 1E-8 torr). Film thicknesses can be varied. Standard thicknesses are given here. During all deposition steps the tip is oriented normal to the sources and rotating at 20 rpm in order to achieve a uniform growth. First, a 500 nm-thick SiO2 film is deposited at room temperature at 7 mtorr sputtering pressure in an atmosphere of 70% Ar and 30% $O_2$. In a second step a 20 nm-thick Ti film is deposited at 4 mtorr deposition pressure. Finally, 500 nm Au are deposited at 4 mtorr.

3) Characterization (optional): Tips are now characterized by full-field X-ray imaging and/or X-ray tomography. This facilitates the following fabrication step, since the position of the conducting tip inside of the coated layers can be determined before the apex is finally exposed again. Additionally, the quality of the outer layer can be investigated by scanning electron microscopy (SEM).

4) Milling: Focused ion beam (FIB) milling with Ga+ ions impinging at the tip (30 kV, 50 pA) is used to expose the apex, removing the oxide coating produced by sputtering deposition. A programmable NANORotator (see below) was invented to manipulate the tip inside of the FIB system.

Figure 5A:
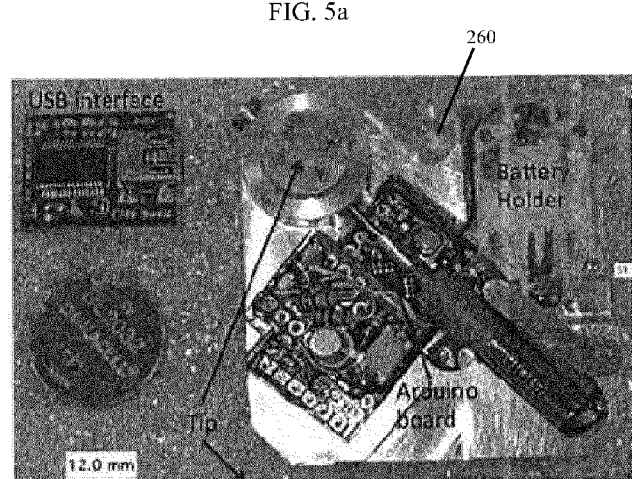
FIG. 5a-5c show a programmable NANORotator component as a plug-in for existing SEM/FIB system which can be used for tip fabrication.
Figure 5B:
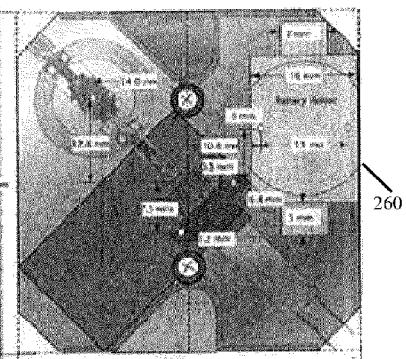
Figure 5C:
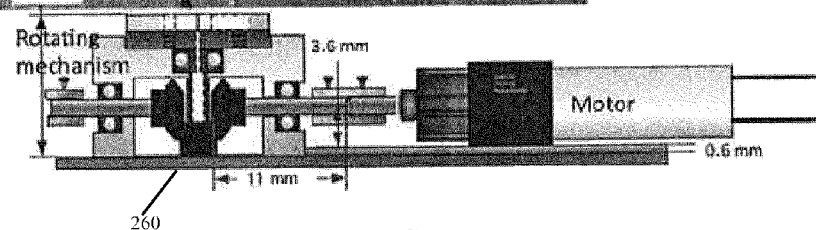

After coating the tip 200 with the various films described above the apex region has to be dissected again. The goal is to expose a nanoscale conducting apex. This is achieved by FIB. However, in a FIB system the ion gun is stationary. Thus the tip 200 has to be rotated during the milling process in order to expose the apex from all sides (360 degree). Many conventional FIB systems offer only sample stages with translation degrees of freedom. The NANORotator (cf., FIGS. 5a-5c) is the solution. It is a plug-in for SEM/FIB systems. It drastically expands the capabilities of any existing SEM/FIB by adding a rotational degree of freedom that does not require any costly change of the system. In addition to the tips any sample could be rotated using the NANORotator. The invention was tested in a Zeiss 1540XB FIB, but it could also be used in other systems since the invention is modular. The base plate could easily be modified to allow operation in other SEM/FIB systems.

The NANORotator is operated by a programmable micro controller 260, which allows a precise control of the rotation speed and intervals. The NANORotator is battery and/or USB powered. This is a big advantage, because as a plug-in the NANORotator does not require any additional wiring or vacuum feedthroughs in the SEM/FIB system in which it is utilized. The sample mount is coated by Au and electrically isolated from the rest of the rotating mechanism. Using a bottom electrode electric transport measurements can be performed directly inside of the NANORotator. This allows characterizing the quality of the insulating film (resistance measurement) of the tip.

Advantages of the NANORotator are:
1) Very compact rotation stage (50×50 mm2).
2) Operation in vacuum.
3) Modular design can be adapted to any application that requires in-situ rotation.
4) Programmable micro controller for ultimate flexibility.
5) Battery or USB powered.
6) Plug-in does not require any changes to SEM/FIB systems in which it is used.
7) Holder electrically isolated; Transport measurements possible.
8) Low cost (~$2 k). Typically, vacuum rotation stages cost tens of thousands of USD.

The following non-limiting examples illustrate various aspects of the invention and preferred embodiments in particular.

EXAMPLE 1

Smart Tip Rotator: Complete Components List

The following sets forth a component list for the NanoRotator 260 described hereinbefore.
Microprocessor:
1 Arduino Pro Mini, 3.3V
1 FTOI Basic Breakout, 3.3V (allows powering and communication with computer through USB)
1 USB Mini-B Cable, 6 foot
Transistors:
1 bipolar, NPN, type 2N2222
Resistors:
1 metal film resistor, 7.5 Ohm, 0.6 W
1 metal film resistor, 65 Ohm, 0.4 W
Capacitors (Ceramic):
1,220 microfarad
Diode:
1 Standard, 1 A, 50V, type 1N4001GP-E3
LED's:
1 green LED, SMD, 50 mcd, 2V, 20 mA, 130 degrees viewing angle.
1 red LED, SMD, 50 mcd, 2V, 20 mA, 130 degrees viewing angle.
Battery:
2 Lithium button battery type CR2016, 3V.
1 battery holder, 20 mm coin cell, surface mount
Screws (Bottom Electrode-Transport Tip Characterization):
Metric head slotted machine screws, 18-8 SS, 5 to 10 mm long.
Adapter:
1 dovetail stage adapter for SEISS.LEO SEM and FIB
Bearings/Gears/Motor:
2 hydro-dynamic pressure bearing, 1.5 mm bore, 4 mm 00, 2 mm wide
3 Miter gear, 1/1 ratio, pitch 45 degrees, pressure angle 20 degrees. 14 teeth, 1.5 mm bore diameter
1 motor, 1.5 mm shaft, miniature planetary gear, 3V, 10 mA, 14 rpm
1 universal motor mount, glass fiber reinforced engineering plastic

EXAMPLE 2

Figure 6A:
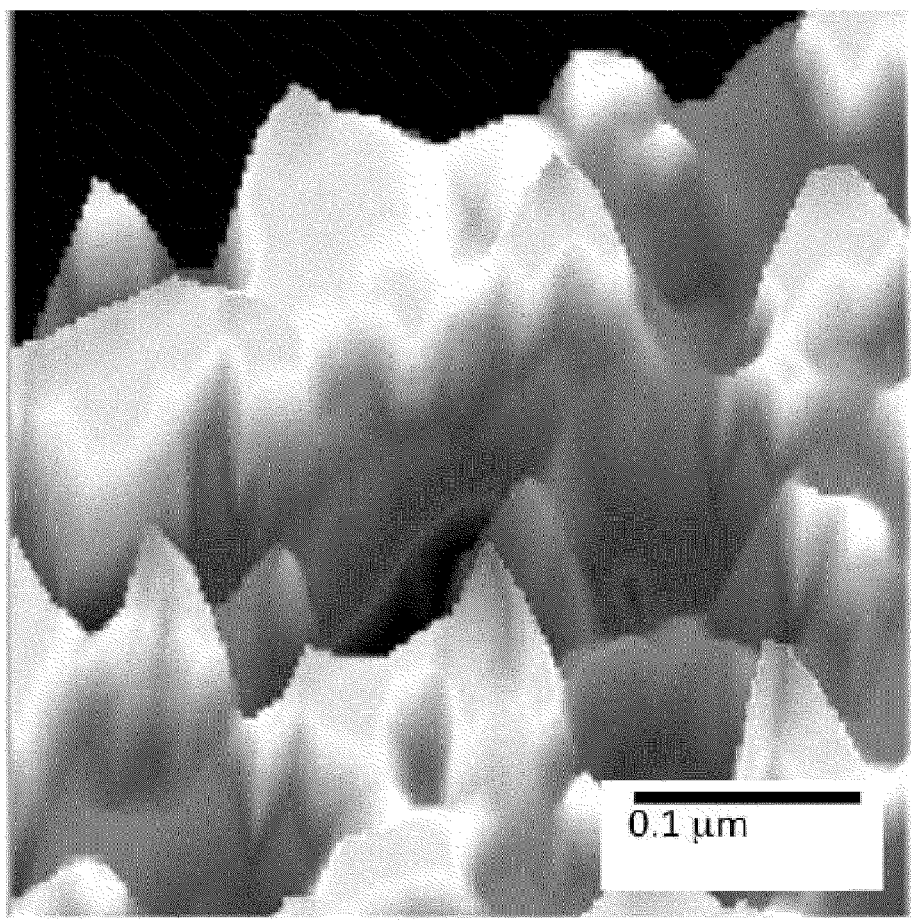
FIG. 6a shows topography of a surface of material which is Co enriched alumina clusters.
Figure 6B:
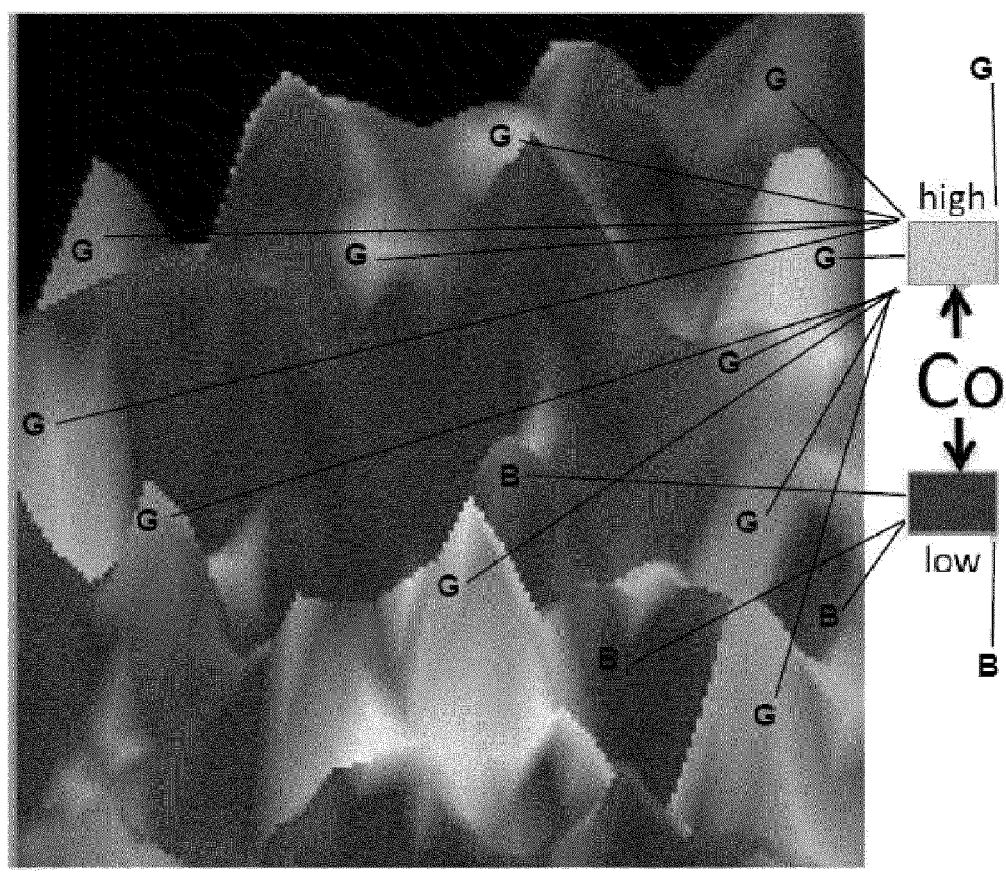
FIG. 6b shows chemical imaging of the material of FIG. 6a illustrating the Co enrichment.

The functionality of the invention has been verified in both (1) the spectroscopy mode (ramping the photon energy while the tip tunnels over a fixed sample location) and (2) imaging mode (rastering the tip over the sample surface while the X-ray energy is fixed to a particular absorption energy of interest). The three components (topo-filter, coaxial smart tip, and NANORotator) have been utilized to achieve simultaneous topography and chemical imaging using the setup shown in FIG. 1. One example result is shown in FIGS. 6*a* and 6*b*, where both the topographic surface (FIG. 6*a*) and the chemical image (FIG. 6*b*) of the sample surface 130 have been obtained (Co in alumina clusters). The typical scan speed is about 5 ~s per pixel. FIGS. 3*a* and 3*b* show a comparison of spectroscopy scans of the photon energy while the tip 130 (200) is tunneling over a Cu(111) surface. The X-ray illumination with a photon energy around the Cu K edge on the sample gives rise to an absorption spectrum that can be measured using the tip current ("red"). If this tip current is directly used for the feedback loop (as in FIG. 3*a* the z-piezo reacts attempting to maintain a predetermined current setpoint. As shown in FIG. 3*a*, the tip 120 (200) retracted by over 0.5 nm when trying to stabilize the tip current. Post-edge, the tip current increased by −5 pA in magnitude and becomes very noisy due to the interplay between the STM feedback system and X-ray induced currents. The fact that both the z-piezo and the tip current react to the energy sweep indicates the problematic convolution of the signals.

However, when the topo-filter 160 is used, this is not the case. Here we have increased the X-ray slit size from 50×50~$\mu m^2$ to 500×500~$\mu m^2$, which boosts the photocurrent by ~12 times to ~60 pA. Despite the significant increase in X-ray induced currents, the z-piezo ("green") remains stable and does not react to the changes in the X-ray energy. This clearly indicates that the topo-filter has removed the X-ray induced current and provides only the topographic component (blue) to the feedback system. As a result, stable tunneling current is perfectly maintained allowing for the simultaneous measurement of topographic and chemical properties.

In summary, the invention includes, inter alia, the following attributes:
1) An electrical circuit to maintain a constant STM height over a surface both in a STM mode and STM with X-ray impingement.
2) A method of making a coaxial tip for any variant scanning probe microscopes (STM, SXSTM, AFM, KFM, etc.)
3) Simultaneous topographical and chemical/magnetic surface characterization (X-ray absorption spectrographic data) measurements.
3) The cost for manufacturing both is relatively low.
4) The topo-filter and the coaxial tips are easy plug-ins into existing STMs.
5) The programmable compact NANORotator is an easy plug-in (upgrade) for existing SEM/FIB systems that adds a rotational degree of freedom at low cost.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. A method of simultaneously analyzing topographic and elemental/chemical/magnetic data in a scanning tunneling microscope, comprising the steps of:
providing an STM probe with a tip;
providing an X-ray source and a beam chopper for generating chopped X-rays from the X-ray source and directing the chopped X-rays from the X-ray source onto a sample having a surface;
generating a conventional tunneling current component from the X-rays interacting with the sample and directing the conventional tunneling current to a first channel;
generating a second current from the X-rays interacting with the sample and including an elemental/chemical/magnetic characteristic current and directing the second current to a second channel;
separating out the conventional tunneling current for analysis with a lock-in amplifier and filter;
analyzing the conventional tunneling current to output topographic information about the sample surface;
analyzing the second current to output elemental/chemical/magnetic information about the sample; and
analyzing output from the lock-in amplifier by an instrumentation amplifier to determine difference between (a) total current arising from the X-ray beam interacting with the sample and (b) the second current
wherein current input to the filter is operated on by the lock-in amplifier to remove components of the elemental/chemical/magnetic characteristic current, thereby enabling isolation of the topographic information in the first channel.

2. The method as defined in claim 1 wherein a lock-in amplifier is used alone to separate out the elemental/chemical/magnetic current for analysis.

3. The method as defined in claim 1 wherein the filter comprises a unit-gain amplifier and a low-pass filter.

4. The method as defined in claim 1 wherein distance z of the tip from the sample is adjusted to assist in removal of the element/chemical/magnetic characteristic current.

5. A system for simultaneously analyzing topographic and elemental/chemical/magnetic data from a sample in a scanning tunneling microscope, comprising:
an STM probe having a tip;
an X-ray source and a beam chopper for generating a chopped X-ray beam;
a lock-in amplifier operating on an input signal arising from the X-ray beam striking the sample to provide a first signal characteristic of elemental/chemical/magnetic information; and
a filter including an amplifier and a low-pass filter, the filter operating on the input signal to provide a second signal output for analysis of only topographic information wherein the filter comprises, a first circuit segment having an $I_{SXSTM}$ circuit input into an operations amplifier whose output is to a low pass filter and an output to a positive side of an instrumentation amplifier and a second circuit segment in parallel with the first circuit segment having a $U_{OUT}$ circuit input derived from a lock-in amplifier which outputs a signal to an operational amplifier which outputs a second signal to a resistor $R_1$ which outputs a third signal to a negative side of the instrumentation amplifier and also outputs the second signal to a grounded potentiometer $R_2$, the instrumentation amplifier providing a resulting output signal OUT for the filter.

6. The system as defined in claim 5 wherein the STM tip having a plurality of layers including a conducting base tip, an insulating layer disposed on the base tip, a titanium layer on the insulating layer and an outer noble metal layer.

7. The system as defined in claim 6 wherein the conducting base tip comprises PtIr.

8. The system as defined in claim 6 wherein the insulating layer comprises $SiO_2$.

9. The system as defined in claim 6 wherein the outer noble metal layer comprises Au.

10. The system as defined in claim 6 wherein the tip comprises a nanoscale conducting apex portion.

11. The system as defined in claim 10 wherein the apex portion is fabricated by FIB.

12. The system as defined in claim 11 further including a nanorotator component for manipulating the tip, thereby enabling fabrication of the apex portion.

13. A system for simultaneously analyzing topographic and elemental/chemical/magnetic data from a sample in a scanning tunneling microscope, comprising:
- an STM probe having a tip;
- an X-ray source and a beam chopper for generating a chopped X-ray beam;
- a lock-in amplifier operating on an input signal arising from the X-ray beam striking the sample to provide a first signal characteristic of elemental/chemical/magnetic information; and
- a filter including an amplifier and a low-pass filter, the filter operating on the input signal to provide a second signal output for analysis of only topographic information;
- the STM tip having a plurality of layers including a conducting base tip, an insulating layer disposed on the base tip, a titanium layer on the insulating layer and an outer noble metal layer.

14. The system as defined in claim 13 wherein the filter comprises, a first circuit segment having an $I_{SXSTM}$ circuit input into an operations amplifier whose output is to a low pass filter and an output to a positive side of an instrumentation amplifier and a second circuit segment in parallel with the first circuit segment having a $U_{OUT}$ circuit input derived from a lock-in amplifier which outputs a signal to an operational amplifier which outputs a second signal to a resistor $R_1$ which outputs a third signal to a negative side of the instrumentation amplifier and also outputs the second signal to a grounded potentiometer $R_2$, the instrumentation amplifier providing a resulting output signal OUT for the filter.

15. The system as defined in claim 13 wherein conducting base tip comprises PtIr, the insulating layer comprises $SiO_2$, the outer noble metal layer comprises Au, and the tip comprises a nanoscale conducting apex portion.

16. The system as defined in claim 13 wherein the apex portion is fabricated by FIB.

17. The system as defined in claim 13 further including a nanorotator component for manipulating the tip, thereby enabling fabrication of the apex portion.

\* \* \* \* \*